Jan. 18, 1927. 1,614,856
W. OVERBECK, JR
GUARD FOR MOTOR CARS AGAINST ROPE OBSTRUCTIONS
Filed May 1, 1926
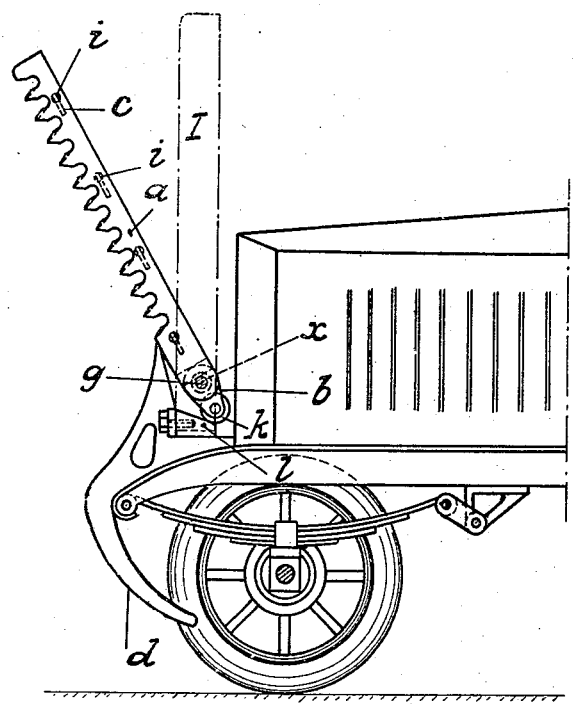
Witnesses: Inventor:

Patented Jan. 18, 1927.

1,614,856

UNITED STATES PATENT OFFICE.

WILHELM OVERBECK, JR., OF BOCHUM, GERMANY.

GUARD FOR MOTOR CARS AGAINST ROPE OBSTRUCTIONS.

Application filed May 1, 1926, Serial No. 106,179, and in Germany May 7, 1925.

This invention relates to a guard for motor-cars against rope obstructions, by which the rope caught by the guard is cut in a way known in the art with the aid of the rope resistance by shearing action. According to the invention, the shearing action is produced by saw blade-shaped cutters provided in blades which are movable with reference to one another in parallel direction, and the shearing displacement is effected by the fact that at a turning movement of one blade on its fulcrum by the rope pressure the other blade participating in said turning movement is displaced along the one blade by its being positively guided thereon. Said positive guide consists preferably of an inclined plane, upon which runs the non-fulcrumed blade by means of a roller or the like, whereby a large transmission aiding in the cutting action is attained.

The accompanying drawing illustrates the improvement in a side view on the front end of a motor car.

Of the two saw blades $a$, $b$ exerting the shearing action, the blade $a$ is fulcrumed at $g$ to the frame of the motor car while the blade $b$ is positively guided along the blade $a$ by having therewith a slot-and-pin connection $c$, $i$. The non-fulcrumed blade $b$ carries at its rear end a roller $k$ in contact with an inclined plane $l$ fixed on the frame of the motor-car.

If the shears $a$, $b$ are, from the position ready for use and shown by full lines, turned on the fulcrum $g$ by a rope obstruction crossing the road into the dot-and-dash line position I, the roller $k$ travels up the inclined plane $l$ and thereby the blade $b$ is displaced with reference to the blade $a$ in parallel direction. By the shearing action thereby produced, the rope is cut.

A coil spring on the fulcrum $g$ indicated at $x$ serves to always return the device into its position ready for use.

A downwardly directed arm $d$ on the frame of the motor-car serves to depress a rope crossing the road at a height that is deeper than the point P.

What I claim, is:

1. A guard for motor-cars against rope obstructions, comprising a turnable saw blade, a fixed fulcrum for the latter, another saw blade positively guided along the first blade, and means to move the non-fulcrumed blade along the fulcrumed blade when turning the latter in rearward direction.

2. A guard for motor-cars as specified in claim 1, means to always return said blades to their position ready for use.

In testimony whereof I have hereunto set my hand.

WILHELM OVERBECK, JR.